United States Patent
Bulman

(10) Patent No.: US 9,291,124 B2
(45) Date of Patent: Mar. 22, 2016

(54) COMBINED CYCLE INTEGRATED COMBUSTOR AND NOZZLE SYSTEM

(71) Applicant: Aerojet Rocketdyne, Inc., Rancho Cordova, CA (US)

(72) Inventor: Melvin J. Bulman, Fair Oaks, CA (US)

(73) Assignee: AEROJET ROCKETDYNE, INC., Rancho Cordova, CA (US)

(*) Notice: Subject to any disclaimer, the term of this patent is extended or adjusted under 35 U.S.C. 154(b) by 135 days.

(21) Appl. No.: 14/199,769

(22) Filed: Mar. 6, 2014

(65) Prior Publication Data
US 2015/0007550 A1    Jan. 8, 2015

Related U.S. Application Data

(63) Continuation of application No. 13/008,939, filed on Jan. 19, 2011, now Pat. No. 8,701,379, which is a continuation-in-part of application No. 11/640,646, filed on Dec. 18, 2006, now Pat. No. 7,886,516.

(51) Int. Cl.
| | |
|---|---|
| *B64B 1/24* | (2006.01) |
| *F02K 7/18* | (2006.01) |
| *F02K 7/14* | (2006.01) |
| *F02K 7/16* | (2006.01) |
| *F02K 7/10* | (2006.01) |

(52) U.S. Cl.
CPC ... *F02K 7/18* (2013.01); *F02K 7/10* (2013.01); *F02K 7/14* (2013.01); *F02K 7/16* (2013.01); *F05D 2220/10* (2013.01); *Y02T 50/67* (2013.01)

(58) Field of Classification Search
CPC ............... F02K 7/16; F02K 7/18; F02C 3/32; F02C 6/02
See application file for complete search history.

(56) References Cited

U.S. PATENT DOCUMENTS

| | | | | |
|---|---|---|---|---|
| 2,696,078 A | * | 12/1954 | Waitzman | F02K 7/16 60/201 |
| 4,817,892 A | * | 4/1989 | Janeke | B64C 1/16 244/15 |
| 5,094,070 A | * | 3/1992 | Enderle | F02K 1/1215 60/224 |
| 7,886,516 B2 | * | 2/2011 | Bulman | F02K 7/14 60/39.15 |
| 8,701,379 B2 | * | 4/2014 | Bulman | F02K 7/14 244/53 R |

* cited by examiner

*Primary Examiner* — Brian M O'Hara
*Assistant Examiner* — Assres H Woldemaryam
(74) *Attorney, Agent, or Firm* — Joel G. Landau

(57) ABSTRACT

An engine that operates and produces the entire required vehicle thrust below Mach 4 is useful for a Hypersonic combined cycle vehicle by saving vehicle and engine development costs. One such engine is a combined cycle engine having both a booster and a dual mode ramjet (DMRJ). The booster and the DMRJ are integrated to provide effective thrust from Mach 0 to in excess of Mach 4. As the booster accelerates the vehicle from Mach 0 to in excess of Mach 4, from Mach 0 to about Mach 2 incoming air delivered to the DMRJ is accelerated by primary ejector thrusters that may receive oxidizer from either on-board oxidizer tanks or from turbine compressor discharge air. As the TBCC further accelerates the vehicle from about Mach 0 to in excess of Mach 4 exhaust from the turbine and exhaust from the DMRJ are combined in a common nozzle disposed downstream of a combustor portion of the DMRJ functioning as an aerodynamic choke.

4 Claims, 5 Drawing Sheets

COMBINED CYCLE INTEGRATED COMBUSTOR AND NOZZLE SYSTEM

CROSS REFERENCE TO RELATED APPLICATION(S)

This application is a continuation of U.S. patent application Ser. No. 13/008,939, titled "Combined Cycle Integrated Combustor and Nozzle System" that was filed Jan. 19, 2011 and that issued on Apr. 22, 2014 as U.S. Pat. No. 8,701,379. U.S. Ser. No. 13/008,939 is a continuation in part of U.S. patent application Ser. No. 11/640,646, titled "Combined Cycle Integrated Combustor and Nozzle System," that was filed on Dec. 18, 2006 and that issued as U.S. Pat. No. 7,886,516 on Feb. 15, 2011. The disclosures of U.S. Ser. No. 11/640,646 and U.S. Pat. No. 7,886,516 are incorporated by reference herein in their entirety.

U.S. GOVERNMENT RIGHTS

N.A.

BACKGROUND OF THE INVENTION

1. Field of the Invention

This invention relates to a combined cycle engine system that combines a turbojet or other booster engine and a Dual Mode Ramjet (DMRJ) to permit efficient operation from takeoff to hypersonic speeds and more particularly from Mach 0 Sea Level to Mach 5+ at high altitude.

2. Description of the Related Art

A conventional DMRJ cannot produce thrust to accelerate itself to supersonic speeds. The DMRJ must be boosted by some other propulsive element, such as a Turbojet Engine (TJ) and/or an Ejector Ramjet (ERJ). When the booster engine is a turbojet (turbine) engine, the combined cycle engine is referred to as a Turbine Based Combined Cycle or TBCC engine. If the booster is a rocket engine, it is referred to as a Rocket Based Combined Cycle or RBCC engine. When both booster types are used, the combined cycle is referred to as a Turbine/Rocket Based Combined Cycle T/RBCC engine. In prior art reusable hypersonic vehicle concepts, the turbine engines of a TBCC engine are expected to produce all of the thrust at subsonic and low supersonic speeds. At some higher speed, the DMRJ is turned on to produce the required thrust and the TJ is turned off at nearly the same speed and taken out of the flow. The thrust of the TJ engine as the sole propelling means during the bulk of the acceleration places a great demand on the TJ technologies. Prior art TBCC engines have little or no DMRJ thrust contribution at speeds below Mach 3-4. The highest thrust requirement for these vehicles occurs during acceleration from subsonic to supersonic speeds. This so called "transonic" speed has the greatest drag to overcome. From the foregoing, it is seen that the greater the thrust contribution from the DMRJ during acceleration the less demands are placed on the turbine engine.

Current turbine engine technology is suitable for speeds up to Mach 2.5. Above this speed, the air temperature becomes too high to permit high compressor pressure ratio without exceeding the turbine entrance temperature limits. This results in a reduction in engine airflow and thrust. A Lockheed SR-71 high-speed, high-altitude, reconnaissance aircraft was able to fly at about Mach 3.25 by bypassing some of the air around the final compressor stages in the Pratt & Whitney J-58 engine. This unloaded the compressor, reducing the combustion heat addition required upstream of the turbine. Such an engine cycle is referred to as a Turbo-Ramjet since most of the high Mach thrust is produced in an afterburner downstream of the turbine. This engine cycle is not a preferred cycle for a TBCC system which would need a third duct for DMRJ operation. Since the DMRJ duct must operate at speeds beyond what the TJ can stand, the DMRJ air flow must bypass the TJ completely. One important issue with the prior art TBCC engines is the requirement for the Turbine engine to operate to Mach 4 or higher. This places a large technical hurtle to develop a pure Turbojet that can operate with high thrust at Mach 4 or higher. The thrust a TJ can produce as a function of Mach number is dependent on the technologies applied. For Mach 4 operation at high thrust, advanced high strength high temperature materials are needed that are not currently available.

When not operating, the DMRJ flowpath increases vehicle drag if air flows through the duct or around it. At speeds below typically Mach 5, the TBCC nozzle is over-expanded (too large) which reduces the net thrust. Increasing the size of the turbine to produce sufficient thrust to overcome the vehicle and the non-operating DMRJ engine drag has severe mission consequences due to greater vehicle empty weight and reduced available fuel volume. U.S. Pat. No. 7,216,474 to Bulman et al. discloses a TBCC having an integrated inlet that manages the flow of air to both the TJ and DMRJ elements. The U.S. Pat. No. 7,216,474 patent is incorporated by reference in its entirety herein.

It is known that the thrust in a DMRJ at low speeds is limited due to low ram pressure and premature thermal choking of the combustor. We address each of the limiting factors on low Mach TBCC thrust:

Subsonic to Low Supersonic Thrust—As a ram compression cycle, the DMRJ has little thrust potential at low speeds. For typical TBCC powered hypersonic vehicles the drag at transonic speeds (Mach 0.8-1.3) is usually more than the turbine engine can produce. Additional thrust is needed but just installing a larger turbojet engine is unattractive in a weight and volume sensitive hypersonic vehicle.

Low Supersonic to Mach 4 Thrust—Prior art DMRJs have a Scramjet diverging combustor and an isolator to allow operation with a thermal throat. These engines are usually not capable of producing useful thrust much below about Mach 4. A first factor is a low inlet/isolator pressure rise capability at low speeds. A second factor is that at low speeds and typical combustor area ratios, the pressure rise for a given fuel equivalence ratio increases at low supersonic speeds. FIG. 1 shows the temperature rise to thermally choke a DMRJ as a function of speed and combustor Area Ratio (AR). A typical prior art DMRJ has a small AR, on the order of 2 (Reference line 10), suitable for the higher speeds. The engine thrust is directly related to the temperature rise. If too much heat is added with a low AR combustor, the combustor pressure will exceed the inlet capability and the inlet will unstart. This miss-match between available pressure and combustor back pressure prevents practical thrust from a prior art DMRJ. Below Mach 4, a high area ratio combustor improves this situation (Reference line 12), but is inefficient for high speed operation since it increases the wetted area exposed to the high speed, high enthalpy, flow—increasing engine weight and heat load while reducing high speed thrust.

Combined Cycle Engine Thrust—Typical prior art hypersonic cruise vehicles have as large a nozzle exit area as practical since at cruise speed the exhaust is underexpanded and thrust and Isp increase with larger nozzles. At low speeds, the exhaust is then over-expanded and thrust and Isp are lower than they would be with a smaller nozzle. One solution to this problem, creating a larger volume of gas to help fill and pressurize the nozzle, is disclosed in U.S. Pat. No. 6,568,171 to Bulman. U.S. Pat. No. 6,568,171 is incorporated by reference in its entirety herein.

BRIEF SUMMARY OF THE INVENTION

Accordingly, an object of the invention is to provide an engine that operates and produces the entire required vehicle thrust below Mach 4. A feature of this object is that a Hypersonic combined cycle vehicle become more near term, thereby saving further vehicle and engine development costs. One such engine is a turbine based combined cycle (TBCC) engine having both a turbine and a dual mode ramjet (DMRJ). The turbine and the DMRJ are integrated to provide effective thrust from Mach 0 to in excess of Mach 4.

As the Combined Cycle Engine accelerates the vehicle from Mach 0 to in excess of Mach 4, from Mach 0 to about Mach 2 incoming air delivered to the DMRJ is accelerated by primary ejector thrusters that may receive oxidizer from either on-board oxidizer tanks or from turbine compressor discharge air. As the Combined Cycle Engine further accelerates the vehicle from about Mach 0 to in excess of Mach 4 exhaust from the booster engine and exhaust from the DMRJ are combined in a common nozzle disposed downstream of a combustor portion of said DMRJ functioning as an aerodynamic choke.

The details of one or more embodiments of the invention are set forth in the accompanying drawings and the description below. Other features, objects and advantages of the invention will be apparent from the description and drawings, and from the claims.

BRIEF DESCRIPTION OF THE DRAWINGS

Like reference numbers and designations in the various drawings indicated like elements.

DETAILED DESCRIPTION

This invention improves the performance of a combined cycle engine during the critical acceleration from takeoff to ramjet takeover and includes two elements that significantly increase the combined thrust of a booster and DMRJ components when operating in parallel (Mach 0-3+). At speeds below where a ramjet is normally capable of operating, turbine compressor bleed air or onboard oxidizers are used to drive small primary ejector thrusters to induce airflow into a dual mode ramjet flowpath and produce thrust as a well known Ejector Ramjet (ERJ). In addition, I integrate the DMRJ and booster flows in a synergistic way to increase the overall engine thrust. In this integration, both engines exhausts are merged into a common nozzle. Underexpanded booster engine exhaust is used to create an aerodynamic choke for the DMRJ. This technique solves a critical problem with a low speed DMRJ by providing a larger combustor area and increases the thrust without unstarting the inlet. This allows higher combustion temperature in the DMRJ flow which increases the volume of gases in the nozzle increasing the pressure and thrust while reducing overexpansion losses. In this disclosure, I discuss the combustor and nozzle integration. The high Mach Turbojet engine thrust and technology requirements can be reduced by using a DMRJ engine integration that provides high thrust at low speeds to contribute to the total vehicle thrust.

This invention is an improved combined cycle propulsion system that more completely and efficiently combines the operation of a booster and Dual Mode Ramjet engines. Parallel operation of the DMRJ with the booster engine is enhanced by employing Ejector pumping at low speeds and higher DMRJ combustor area ratio at mid speeds via an aerodynamic choking with the booster exhaust. The combined nozzle flows are more efficient than separate nozzles.

Figure 1:
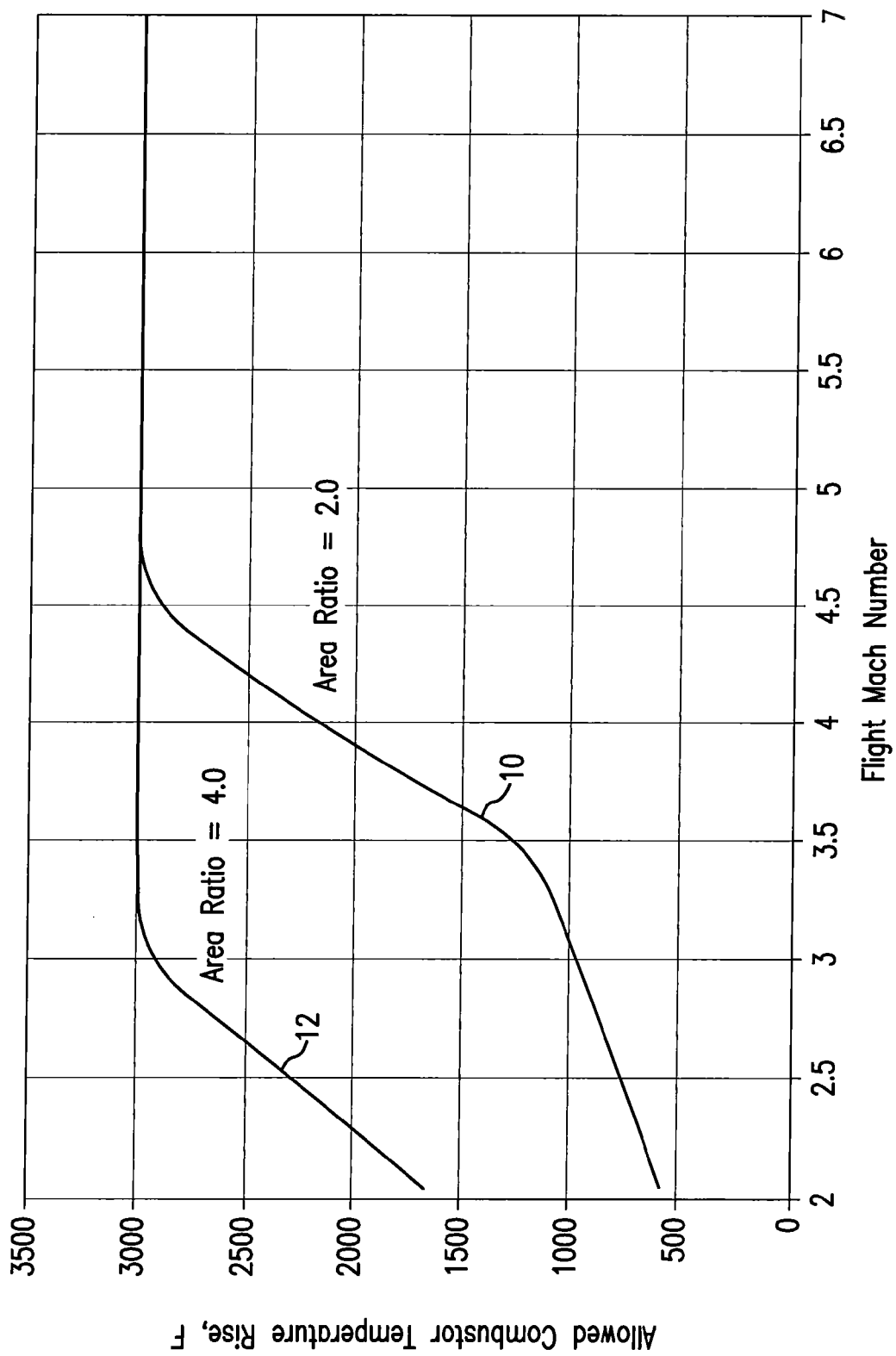
FIG. 1 illustrates the allowed combustor temperature rise as a function of both flight Mach number and combustor area ratio.
Figure 2:
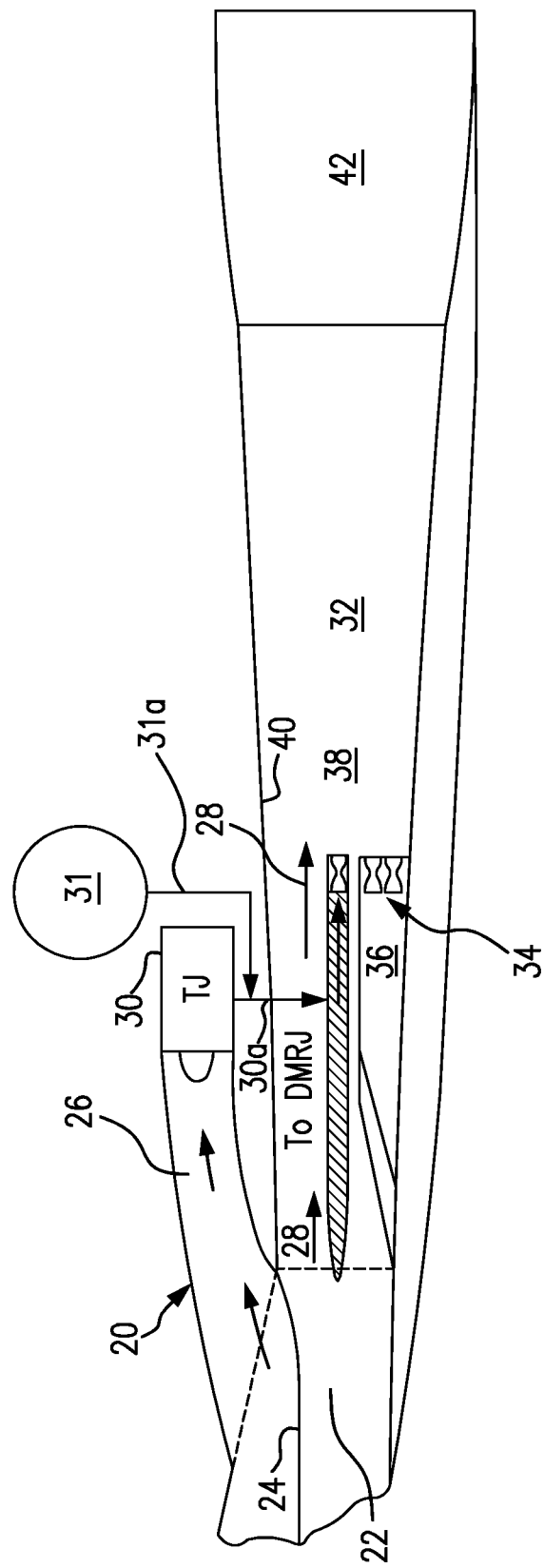
FIG. 2 illustrates a TBCC engine configured for acceleration from stationary to low supersonic speed in accordance with the invention.

During transition from subsonic to low supersonic thrust, to contribute thrust when it is needed most, we convert the DMRJ into an Ejector Ramjet (ERJ). With reference to FIG. 2, the ejector primary thrusters 34 are provided with oxidizer from one of two sources. On board oxidizer tanks 31 are one source. This combined cycle configuration is also called a T/RBCC engine. A second source is to take a small amount of the compressor discharge air (Compressor Bleed)(~10%) from a booster engine 30 if the vehicle is so equipped. The oxidizer is fed by supply lines 30a and 31a. The ejector primaries are located in the trailing edge of struts in the DMRJ. FIG. 2 illustrates both concepts.

A Combined Cycle Engine 20 has a forward facing air inlet 22 with an internal streamline 24 that divides the incoming air into a first airflow portion 26 and a remainder airflow portion 28. The first airflow portion, which at low speeds, nominally comprises 80% of the volume of air, feeds a booster engine 30. The remainder airflow portion 28 enters the DMRJ combustor 32 which at low speeds (below about Mach 2) is used as an Ejector/Mixer. The induced secondary air is accelerated by a plurality of primary ejectors 34. The primary ejectors work by the well known principles of ejector pumping through viscous coupling between the primary and secondary flows.

Primary ejectors 34 are disposed on the trailing edges of struts 36. Fuel injectors (not shown) are positioned to inject fuel into the DMJR in the vicinity of an ejector mixing region 38. Typically, these fuel injectors are also located on the trailing edges of struts 36 or along walls 40 of the ejector mixing region 38. The fuel/air mixture is ignited by a suitable pilot (not shown) and combusted in ejector combustor 32.

Figure 3:
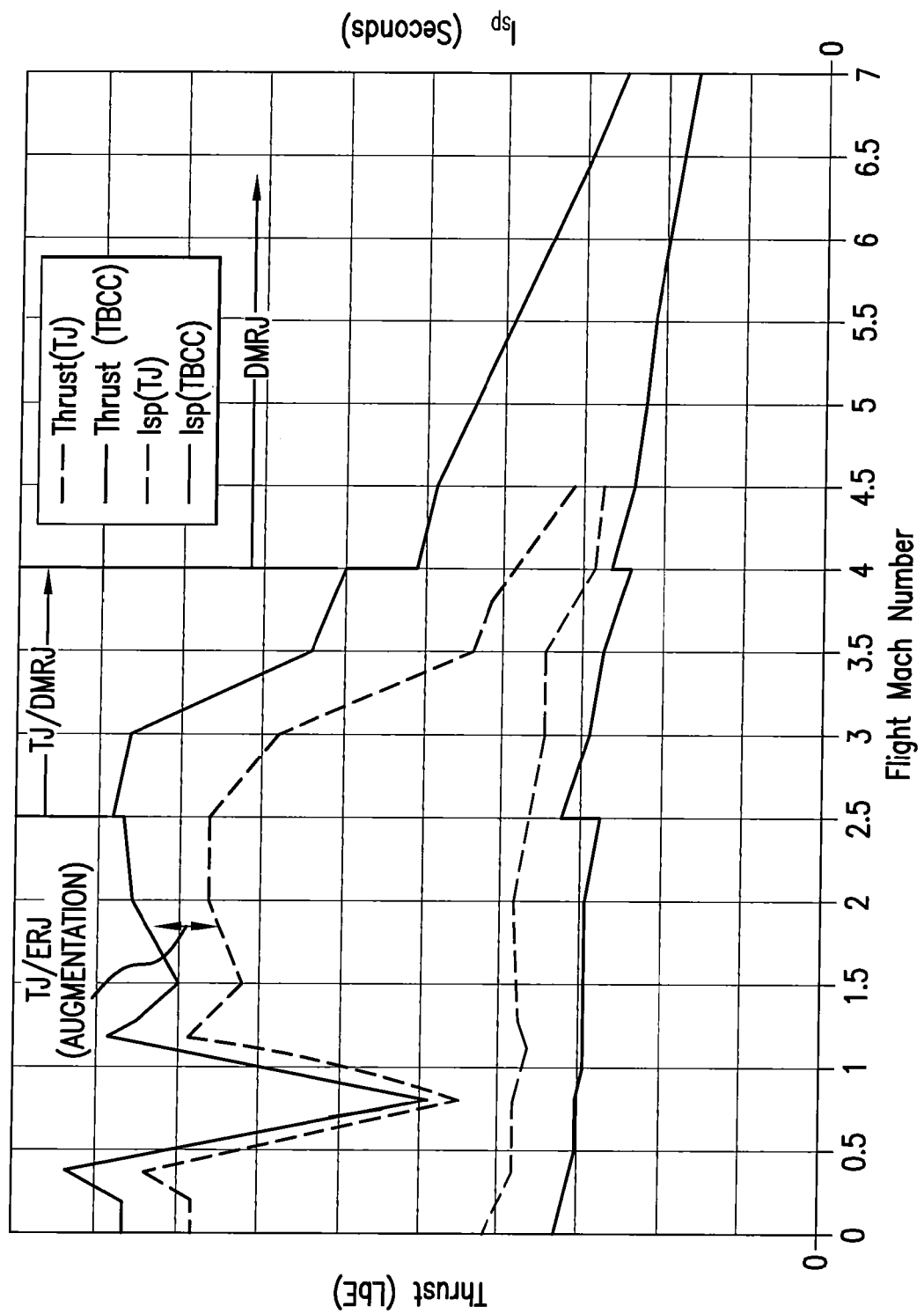
FIG. 3 illustrates an improvement in thrust and Isp as a function of ERJ augmentation.

Removing the bleed air from the booster engine 30 causes a loss in turbine engine thrust but the ejector pumping process induces about three times that much additional airflow through the DMRJ flowpath at low speeds. The subsequent combustion of this additional air results in a 10-20% increase in net engine thrust. The Isp drops a little due to the low pressure in the DMRJ but the net effective Isp (Ieff) is increased. Ieff=(F−D)/(fuel flowrate). FIG. 3 shows how we expect the thrust and Isp to vary with the ERJ Augmentation.

Figure 4:
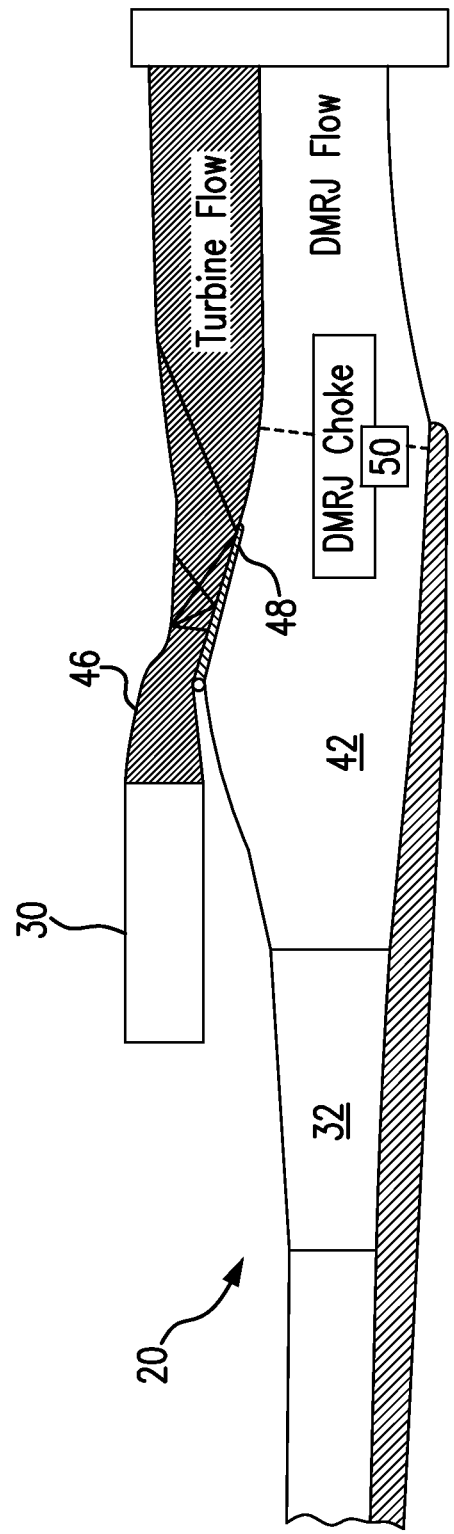
FIG. 4 illustrates a TBCC engine configured for acceleration from low supersonic to about Mach 4.

During acceleration from low supersonic (about Mach 2) to about Mach 4, in order to increase the DMRJ thrust given its allotted airflow, we need to burn more fuel without causing the inlet to unstart. This requires a larger combustor area to avoid premature thermal choking, as previously discussed. As shown in FIG. 4, in our integrated engine concept, we employ a nozzle design that uses the booster exhaust plume to create an aerodynamic blockage or secondary throat downstream of a low AR DMRJ combustor 32 exit within the DMRJ nozzle. This aerodynamic choke located well aft in the common nozzle 42 creates additional combustor flow area (and distance) allowing more fuel to be burned without an inlet unstart. Since more fuel can be burned than without this technique, significantly higher low speed DMRJ thrust results without adverse consequences at higher speeds.

FIG. 4 illustrates the Combined Cycle Engine 20 configured for continued acceleration from low supersonic (Mach~2) to about Mach 4. Downstream of DMRJ combustor 32 is a common nozzle 42. Exhaust 46 from booster engine 30 is directed alongside an exterior wall of the common nozzle 42. An injecting means 48 opens during this phase of the mission enabling exhaust 46 to flow into the common nozzle 42 forming an aerodynamic choke 50.

Figure 5:
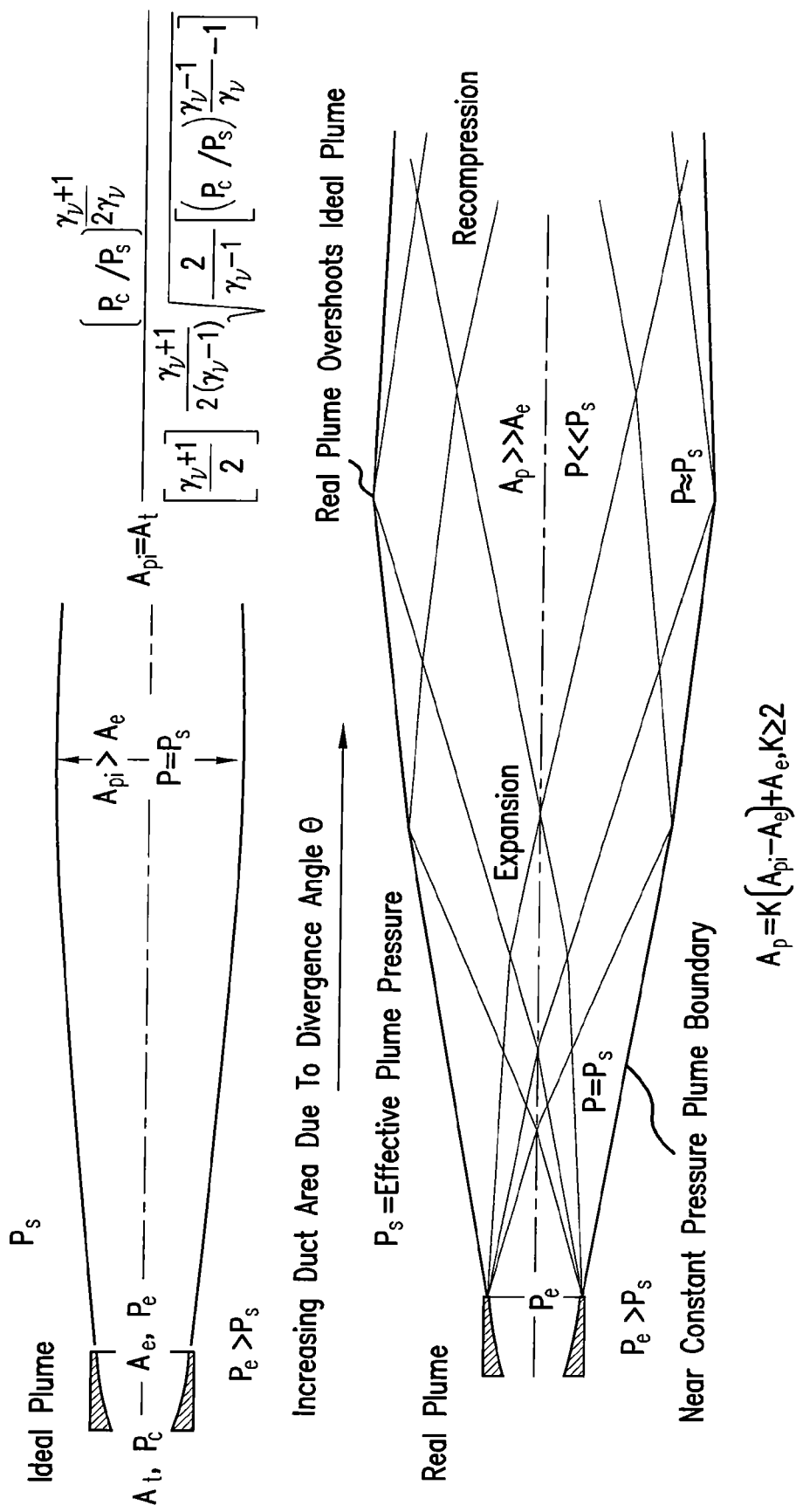
FIG. 5 illustrates how an underexpanded plume overshoots its ideal flow area.

Since the booster exhaust 46 is injected into the common nozzle 42, the flow area remaining for the DMRJ flow is reduced. By selecting the location of the turbine engine nozzle and its degree of expansion, we can create an aerodynamic throat 50 at a larger area than would be possible without this exhaust interaction. A larger throat area permits greater temperature increase at low speeds. Contributing to this effect is the use of an underexpanded booster nozzle exit pressure. When the booster nozzle flow is underexpanded, its exit pressure is greater than the prevailing pressure in the DMRJ nozzle 42. As the booster flow exits its nozzle, it will expand further than even its ideal equilibrium flow area. This process is similar to the Fabri blockage seen in an Ejector Ramjet Engine. FIG. 5 shows how an underexpanded plume overshoots its ideal flow area. This plume overshoot allows the booster engine nozzle to be located further back in the DMRJ nozzle further increasing the effective DMRJ combustor area ratio and thrust. This technique is an improvement over using a large complex and heavy variable geometry nozzle to achieve the same effect.

In FIG. 5:
$A_e$=Turbine Nozzle Exit Area.
$A_p$=Actual Turbine Exhaust Plume Area.
$A_{pi}$=Ideal Turbine Exhaust Plume Area ($P=P_s$).
K=Plume Overshoot Factor.
$P_C$=Turbine Exhaust Total Pressure.
$P_e$=Turbine Nozzle Exit Pressure.
$P_S$=Effective plume pressure.
$\gamma_r$=Turbine Exhaust Specific Heat Ratio.

When at supersonic speeds (less than Mach 5), the parallel operation of the DMRJ combustor with large heat addition generates a larger volume of gas that helps fill and pressurize the common nozzle 42. In a typical Mach 2.5 case, the nozzle exit pressure increases from about ⅓ of ambient to about 75% ambient pressure by the combining of the flows. As disclosed in U.S. Pat. No. 6,568,171, the thrust of both streams is increased. The combined thrust is up to about 50% higher than the turbine alone if it had to fill the nozzle on its own.

One or more embodiments of the present invention have been described. Nevertheless, it will be understood that various modifications may be made without departing from the spirit and scope of the invention. For example, a rocket or other low speed accelerator can be used in place of the turbine engine without deviating from the principles of the invention. The use of an ERJ booster, in parallel with a turbine engine allows the turbine engine to be shut down at a speed compatible with existing engines while the ERJ with the sustained aerodynamic choke to fill the thrust gap between the conventional turbine engine and prior art DMRJs. Accordingly, other embodiments are within the scope of the following claims.

What is claimed is:

1. A method of operating a combined cycle engine, comprising the steps of:
   operating a booster to produce a booster exhaust plume;
   operating a dual mode ramjet (DMRJ) to produce an amount of DMRJ flow; and
   creating using said booster exhaust plume an aerodynamic throat downstream of a low area ratio (AR) DMRJ combustor exit within a DMRJ nozzle.

2. The method of claim 1 wherein said booster exhaust plume is underexpanded.

3. The method of claim 1 wherein said booster is a rocket engine.

4. The method of claim 1 wherein said booster is a low speed accelerator.

* * * * *